US012803082B2

(12) United States Patent
Ryu et al.

(10) Patent No.: US 12,803,082 B2
(45) Date of Patent: Nov. 17, 2026

(54) BATTERY CELL COOLING DEVICE, BATTERY PACK INCLUDING SAME, AND METHOD FOR COOLING BATTERY CELL BY USING SAME

(71) Applicant: LG ENERGY SOLUTION, LTD., Seoul (KR)

(72) Inventors: Jae Uk Ryu, Daejeon (KR); Jin Hak Kong, Daejeon (KR); Min Ho Kwon, Daejeon (KR); Jae Hyuk Kang, Daejeon (KR); Ja Eon Gu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 871 days.

(21) Appl. No.: 18/025,144

(22) PCT Filed: Nov. 15, 2021

(86) PCT No.: PCT/KR2021/016673

§ 371 (c)(1),
(2) Date: Mar. 7, 2023

(87) PCT Pub. No.: WO2022/103231

PCT Pub. Date: May 19, 2022

(65) Prior Publication Data

US 2023/0327237 A1 Oct. 12, 2023

(30) Foreign Application Priority Data

Nov. 16, 2020 (KR) ........................ 10-2020-0152784

(51) Int. Cl.
*H01M 10/6569* (2014.01)
*H01M 10/613* (2014.01)
(Continued)

(52) U.S. Cl.
CPC ..... *H01M 10/6569* (2015.04); *H01M 10/613* (2015.04); *H01M 10/643* (2015.04); *H01M 10/653* (2015.04)

(58) Field of Classification Search
CPC ........... H01M 10/6569; H01M 10/613; H01M 10/643; H01M 10/653
See application file for complete search history.

(56) References Cited

U.S. PATENT DOCUMENTS 4,007,315 A 2/1977 Varta
5,424,143 A 6/1995 Shrim
(Continued)

FOREIGN PATENT DOCUMENTS

CN 108448202 A 8/2018
CN 111788710 A 10/2020
(Continued)

OTHER PUBLICATIONS

International Search Report (with partial translation) dated Feb. 25, 2022, issued in corresponding International Patent Application No. PCT/KR2021/016673.
(Continued)

*Primary Examiner* — James Lee
(74) *Attorney, Agent, or Firm* — Morgan, Lewis & Bockius LLP

(57) ABSTRACT

A battery cell cooling device may include a body part having one side protruding to be assembled with a unit battery cell in a one-to-one correspondence manner, a hollow part defined in the body part and isolated from the outside, a refrigerant isolated and accommodated in the hollow part, and a thermal interface material disposed at one side of the body part to contact the unit battery cell. A battery pack including the same, and a method for cooling a battery cell applied to the same are also disclosed. Particularly, provided
(Continued)

are a battery cell cooling device capable of effectively and individually cooling a plurality of battery cells with a simplified structure, a battery pack, and a method for cooling a battery cell.

9 Claims, 3 Drawing Sheets

(51) Int. Cl.
*H01M 10/643* (2014.01)
*H01M 10/653* (2014.01)

(56) References Cited

U.S. PATENT DOCUMENTS

| | | | |
|---|---|---|---|
| 2012/0003521 A1 | 1/2012 | Sohn | |
| 2012/0171532 A1 | 7/2012 | Lee et al. | |
| 2015/0118529 A1 | 4/2015 | Ahn | |
| 2019/0120565 A1 | 4/2019 | Kuboki et al. | |
| 2020/0083575 A1 | 3/2020 | Yoo et al. | |
| 2020/0194853 A1 | 6/2020 | Yoo et al. | |
| 2020/0227797 A1 | 7/2020 | Kato et al. | |
| 2020/0274208 A1 | 8/2020 | Sucke et al. | |
| 2020/0373634 A1 | 11/2020 | Choi | |
| 2020/0388805 A1 | 12/2020 | Yoo et al. | |
| 2021/0203019 A1 | 7/2021 | Yoon et al. | |

FOREIGN PATENT DOCUMENTS

| | | | |
|---|---|---|---|
| DE | 102017005593 | A1 | 11/2017 |
| DE | 102017005568 | A1 | 12/2018 |
| FR | 2301107 | A1 | 9/1976 |
| JP | S58164150 | A | 9/1983 |
| JP | H10241738 | A | 9/1998 |
| JP | 2001093566 | A | 4/2001 |
| JP | 2001313078 | A | 11/2001 |
| JP | 2005251512 | A | 9/2005 |
| JP | 2007-012486 | A | 1/2007 |
| JP | 2012-216410 | A | 11/2012 |
| JP | 5409561 | B2 | 2/2014 |
| JP | 2014-089839 | A | 5/2014 |
| JP | 6693480 | B2 | 5/2020 |
| KR | 10-2006-0111841 | A | 10/2006 |
| KR | 10-2011-0080537 | A | 7/2011 |
| KR | 10-2012-0003375 | A | 1/2012 |
| KR | 10-1173055 | B1 | 8/2012 |
| KR | 10-2015-0047726 | A | 5/2015 |
| KR | 10-2015-0085310 | A | 7/2015 |
| KR | 10-2016-0024187 | A | 3/2016 |
| KR | 10-2016-0034675 | A | 3/2016 |
| KR | 10-2016-0043761 | A | 4/2016 |
| KR | 10-2019-0047499 | A | 5/2019 |
| KR | 10-2019-0047513 | A | 5/2019 |
| KR | 10-2019-0118135 | A | 10/2019 |
| KR | 10-2020-0012296 | A | 2/2020 |
| WO | 2012-165493 | A1 | 12/2012 |
| WO | 2020/105916 | A | 5/2020 |

OTHER PUBLICATIONS

Partial European Supplementary Search Report dated Sep. 11, 2024, issued in European Patent Application No. 21892398.5.

Office Action issued Mar. 4, 2024 for Japanese Patent Application No. 2023-501306.

First Chinese Office Action dated Apr. 30, 2025 issued in corresponding Patent Application No. 202180057000.3.

European Search Report dated Feb. 10, 2025 issued in corresponding European Patent Application No. 21892398.5.

BATTERY CELL COOLING DEVICE, BATTERY PACK INCLUDING SAME, AND METHOD FOR COOLING BATTERY CELL BY USING SAME

TECHNICAL FIELD

The present disclosure relates to a battery cell cooling device, a battery pack, and a method for cooling a battery cell, and more particularly, to a battery cell cooling device having a simplified configuration, a battery pack including the same to effectively cool each of a plurality of battery cells with a simplified structure, and a method for cooling a battery cell using the same.

BACKGROUND

A secondary battery that is a rechargeable battery is used in various devices such as an electric vehicle and a smartphone. The secondary battery is classified into a one battery cell type and a battery pack type including a plurality of battery cells according to the kind of devices in which the secondary battery is used.

That is, the one battery cell type secondary battery is used for small-sized devices such as the smartphone. Also, the battery pack type secondary battery including a plurality of battery cells is used for medium and large-sized devices such as the electric vehicle.

The battery pack used in the medium and large-sized devices includes a can type secondary battery or a pouch type secondary battery. Since the can type secondary battery has excellent rigidity and durability relative to the pouch type secondary battery, the can type secondary battery is generally used for a battery pack of the electric vehicle. However, since the can type secondary batteries are concentrated in a housing of the battery pack, heat is easily accumulated as the can type secondary batteries serve as obstacles to each other. When the accumulated heat is not quickly dissipated, the can type secondary battery may be exposed to high temperature heat for a long time and quickly deteriorated.

Thus, managing the heat in the housing of the battery pack to prevent the temperature of the can type secondary battery from rapidly increasing is a key factor in battery pack performance management.

The background technology of the present invention is disclosed in a patent document below.

(Patent document 1) KR10-2019-0047499 A

DETAILED DESCRIPTION OF THE INVENTION

Technical Problem

The present disclosure provides a battery cell cooling device having a simplified configuration.

The present disclosure also provides a battery pack capable of individually cooling a plurality of battery cells with a simplified structure and a method for cooling the battery cells.

Technical Solution

In accordance with an exemplary embodiment, a battery cell cooling device includes: a body part having one side protruding to be assembled with a unit battery cell in a one-to-one correspondence manner; a hollow part defined in the body part and isolated from the outside; a refrigerant isolated and accommodated in the hollow part; and a thermal interface material (TIM) disposed at one side of the body part to contact the unit battery cell.

The body part may include: a cylinder body having the hollow part therein; and a holder protruding from one surface of the cylinder body so as to be coupled with an outer circumferential surface of the unit battery cell.

The holder may protrude from an edge of a bottom plate of the cylinder body, and the thermal interface material may be attached to the bottom plate at the inside of the holder to contact the bottom plate of the cylinder body and the unit battery cell therebetween.

The refrigerant may have a volume less than a capacity of the hollow part.

An empty space in the hollow part may have a pressure lower than the atmospheric pressure.

In accordance with another exemplary embodiment, a battery pack includes: a plurality of battery cells; a housing in which the plurality of battery cells are accommodated; and a plurality of battery cell cooling devices assembled with the plurality of battery cells in a one-to-one correspondence manner to individually cool the battery cells. Here, the battery cell cooling device is disposed in the housing and spaced apart from an inner surface of the housing, so that the battery cell cooling device is cooled by an air-cooling manner.

The plurality of battery cell cooling devices may have different cooling capacities according to positions thereof The battery cell cooling device assembled to the outer battery cell may have at least one of a surface area and an amount of the stored refrigerant less than those of the battery cell cooling device assembled to the inner battery cell.

The battery cell cooling device may include: a body part having one surface contacting the battery cell and the other surface opposite to the one surface and exposed to an inner space of the housing, wherein one side of the body part protrudes to be detachably coupled to the battery cell while surrounding an end of the battery cell; a hollow part defined in the body part and isolated from the inner space of the housing; a refrigerant isolated and accommodated in the hollow part; and a thermal interface material (TIM) attached to the body part to contact the battery cell.

The refrigerant may fill a portion of the hollow part.

In accordance with yet another exemplary embodiment, a method for cooling a battery cell includes: a process of individually cooling battery cells, which absorbs heat from each of a plurality of battery cells and dissipates the absorbed heat to a refrigerant accommodated in each of a plurality of battery cell cooling devices by using the plurality of battery cell cooling devices connected to the plurality of battery cells in an one-to-one correspondence manner; and a process of cooling entire battery cells, which dissipates heat absorbed by the plurality of battery cell cooling devices in a housing in which the plurality of battery cells are accommodated.

The process of individually cooling the battery cells may vaporize the refrigerant accommodated in each of the plurality of battery cell cooling devices in a state in which the refrigerant is isolated in each of the plurality of battery cell cooling devices.

In accordance with still another exemplary embodiment, a method for cooling battery cells includes: a cooling device configuration process of allowing a battery cell cooling device to contact the battery cell by arranging a thermal interface material between one end of the battery cell and the battery cell cooling device having a refrigerant therein; and a battery cell cooling process of cooling heat generated from the battery cell by using a temperature of the refrigerant or a vaporization heat of the refrigerant.

Advantageous Effects

According to the exemplary embodiment, the battery cell cooling device may be assembled to the unit battery cell in the one-to-one correspondence manner. Also, the battery cell assembled with the battery cell cooling device may be effectively and individually cooled by using the refrigerant isolated and accommodated in the battery cell cooling device. Thus, the configuration for cooling the battery cell may be simplified, and the heat may be effectively dissipated from each of the plurality of battery cells by using only the simplified structure to quickly and individually cool the plurality of battery cells.

DETAILED DESCRIPTION OF EMBODIMENTS

Figure 1:
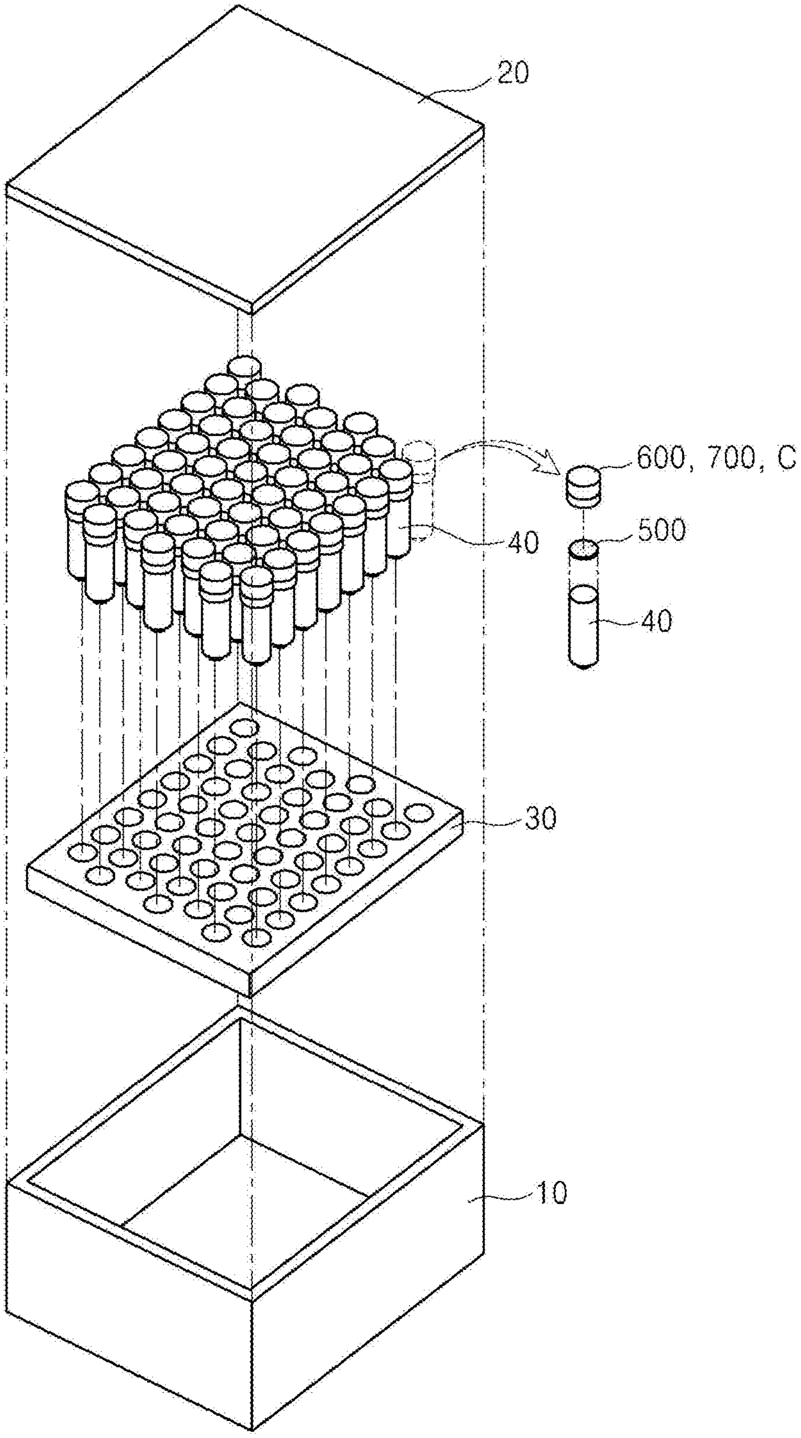
FIG. 1 is an exploded view illustrating a battery pack in accordance with an exemplary embodiment.

Hereinafter, embodiments of the present invention will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the figures, the dimensions of layers and regions are exaggerated for clarity of illustration. Like reference numerals refer to like elements throughout.

Hereinafter, exemplary embodiments will be described in detail with reference to the accompanying drawings.

1. Battery Cell Cooling Device in Accordance with an Exemplary Embodiment

Figure 2:
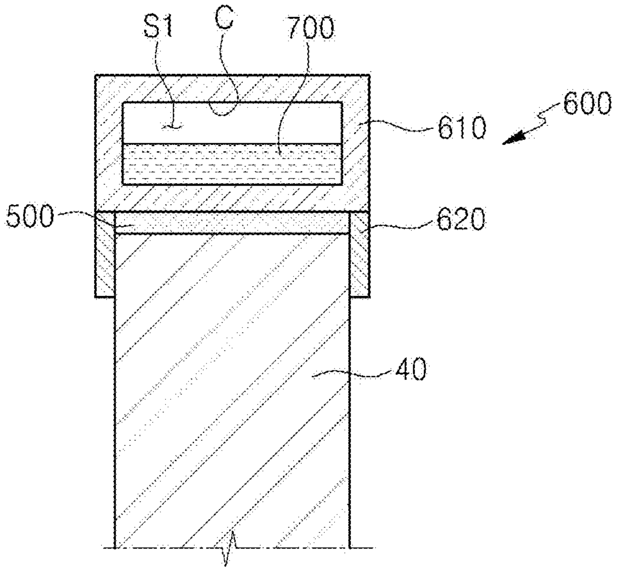
FIG. 2 is a cross-sectional view illustrating a battery cell cooling device in accordance with an exemplary embodiment.

FIG. 1 is an exploded view illustrating a battery pack in accordance with an exemplary embodiment. FIG. 2 is a cross-sectional view illustrating a battery cell cooling device in accordance with an exemplary embodiment.

As illustrated in FIGS. 1 and 2, a battery cell cooling device in accordance with an exemplary embodiment includes: body part 600 having one side protruding to be assembled with a unit battery cell 40 in a one-to-one correspondence manner; a hollow part C defined in the body part 600 and isolated from the outside; a refrigerant accommodated and isolated in the hollow part C; and a thermal interface material 500 disposed at one side of the body part 600 to contact the unit battery cell 40.

1.1. Unit Battery Cell 40

The unit battery cell 40 may be can-type secondary battery. The unit battery cell 40 may include a cylindrical battery can and an electrode assembly (not shown) disposed in the battery can.

The battery can may include a conductive metal material. The battery can may extend in a vertical direction. The battery can may include a cap assembly (not shown) and electrode terminals at a lower end thereof. Here, the battery can may have various shapes including a rectangular battery can.

The electrode assembly may include a positive electrode plate, a separation membrane, and a negative electrode plate, which are overlapped with each other and wound in a jelly-roll shape. Each of the positive electrode plate and the negative electrode plate may include electrode tabs. The electrode tabs may be connected to the electrode terminals, respectively.

1.2. Body Part 600

The body part 600 may be connected with an upper end of the unit battery cell 40. Specifically, the body part 600 may surround the upper end of the unit battery cell 40. Here, the body part 600 may be detachably assembled to the upper end of the unit battery cell 40 through fitting, screw coupling, or bonding. Thus, various units for assembling an inner circumferential surface of the body part 600 and an outer circumferential surface of the unit battery cell 40, e.g., a groove, a projection, a thread, and a structural adhesive may be provided at portions facing each other thereof. Here, thermally conductive paste particles may be mixed in the structural adhesive.

The body part 600 may serve as a heat pipe. For example, the body part 600 may include a thermally conductive metal material such as copper and aluminum. The body part 600 may be referred to as a unit heat pipe, a single-type heat pipe, or an independent-type heat pipe.

1.3. Detailed Structure of Body Part 600

The body part 600 may include a cylinder body 610 including the hollow part C therein and a holder 620 protruding from one surface, e.g., a bottom surface, of the cylinder body 610 so that the holder 620 is coupled to an outer circumferential surface of the upper end of the unit battery cell 40. Here, the cylinder body 610 may be referred to as a frame.

The cylinder body 610 may have a shape corresponding to that of the unit battery cell 40. For example, the cylinder body 610 may have a cylindrical shape corresponding to a cylindrical shape of the unit battery cell 40. Alternatively, when the unit battery cell 40 has a rectangular shape, the cylinder body 610 may also have a rectangular shape. The cylinder body 610 may have a diameter greater than that of the unit battery cell 40. Alternatively, the cylinder body 610 may have a diameter equal to that of the unit battery cell 40. That is, the cylinder body 610 may have various diameters.

The cylinder body 610 may include a top plate and a bottom plate, which are spaced apart from each other to be opposite in the vertical direction, and a side plate connecting an edge of the top plate and an edge of the bottom plate. The bottom plate may be thermally connected to a top surface of the unit battery cell 40 through the thermal interface material 500. Also, the top plate may be spaced a predetermine height from the top surface of the unit battery cell 40.

The cylinder body 610 may have an inner pressure that is varied according to a time as at least a portion of the refrigerant 700 accommodated therein is vaporized and liquefied according to a temperature of the unit battery cell 40. Thus, each of the top plate, the bottom plate, and the side plate may have a predetermined thickness so that the cylinder body 610 sustains a predetermined pressure variation.

The holder 620 may protrude downward from the edge of the bottom plate of the cylinder body 610. The holder 620 may have a predetermined internal diameter allowing the unit battery cell 40 to be inserted thereto. The holder 620 may have a hollow pipe shape. For example, a groove, a projection, a thread, and a structural adhesive may be variously provided in an inner circumferential surface of the holder 620. When the groove or the projection is provided to the inner circumferential surface of the holder 620, the projection or the groove may be provided to the outer circumferential surface of the upper end of the unit battery cell 40. When the thread is provided to the inner circumferential surface of the holder 620, the thread may be also provided to the outer circumferential surface of the upper end of the unit battery cell 40. The structural adhesive may be provided to only the inner circumferential surface of the holder 620, to only the outer circumferential surface of the upper end of the unit battery cell 40, or to all of the two surfaces. Thus, the inner circumferential surface of the holder 620 may be coupled to the outer circumferential surface of the upper end of the unit battery cell 40. Alternatively, the inner circumferential surface of the holder 620 may be fitted and coupled to the outer circumferential surface of the upper end of the unit battery cell 40.

1.4. Thermal Interface Material (TIM) 500

The thermal interface material 500 may be attached to the bottom plate of the cylinder body 610 at the inside of the holder 620 to contact the bottom plate of the cylinder body 610 and the unit battery cell 40 therebetween. Here, the thermal interface material 500 may have a circular plate shape. Alternatively, when the unit battery cell 40 is a rectangular secondary battery cell, the shape of the thermal interface material 500 may be changed in accordance with a cross-sectional shape of the unit battery cell 40.

The thermal interface material 500 may have a vertical thickness less than a vertical length of the holder 620. The thermal interface material 500 may have a bottom surface contacting the top surface of the unit battery cell 40. Also, the thermal interface material 500 may have a top surface contacting the bottom plate of the cylinder body 610.

The thermal interface material 500 may transfer predetermined heat transferred from the inside to the top surface of the unit battery cell 40 to the holder 620. To this end, the thermal interface material 500 may include a material having a predetermined thermal conductivity. The material having a predetermined thermal conductivity may include various materials such as polymer, epoxy, silicon, urethane, and acryl.

Also, the thermal interface material 500 may include a carbon tube (not shown) therein. The thermal interface material 500 may control an inner heat transfer speed and an inner heat distribution according to a preferred method by using the carbon tube having various patterns and disposed therein.

1.5. Refrigerant 700

The refrigerant 700 may be vaporized by absorbing predetermined heat applied from the unit battery cell 40 when the unit battery cell 40 generates heat. Thus, the refrigerant 700 may cool the unit battery cell 40 by using vaporization heat.

The refrigerant 700 may be a liquid at the room temperature or a gas at a heat-generation temperature of the unit battery cell 40.

The refrigerant 700 may maintain a temperature thereof by an air cooling type cylinder body that will be described later instead of the vaporization heat, and reduce the temperature of the unit battery cell generating heat to the maintained temperature.

The refrigerant 700 may be accommodated in the hollow part C defined in the cylinder body 610. Here, the refrigerant 700 may have a volume less than a capacity of the hollow part C. Thus, a refrigerant storage space in which the refrigerant 700 in a liquid state is stored and an empty space S1 in which the refrigerant 700 in a gas state exists or the refrigerant 700 does not exist may coexist.

That is, an extra space in which the refrigerant 700 is vaporized may be secured by reducing the volume of the refrigerant 700 less than the capacity of the hollow part C to form the empty space S1 in the hollow part C. That is, the refrigerant 700 vaporized by absorbing heat from a lower portion of the hollow part C may be introduced to the empty space S1.

Here, the empty space S1 represents a space in which the refrigerant 700 in the liquid state does not exist instead of a space in which nothing exists. That is, the empty space S1 may be a space in which all sorts of gases such as air exist. The empty space S1 in the hollow part C may have a pressure greater than the atmospheric pressure. Alternatively, the empty space S1 in the hollow part C may have a pressure less than the atmospheric pressure. The refrigerant 700 may have a vaporization temperature determined by the pressure of the empty space.

For example, the empty space S1 in the hollow part C may have a pressure less than the atmospheric pressure. Here, the vaporization temperature of the refrigerant 700 accommodated in the hollow part C may decrease by a predetermined temperature from that when the empty space S1 has the atmospheric pressure. Thus, as the empty space S1 has a pressure less than the atmospheric pressure, the vaporization temperature of the refrigerant 700 may decrease, and as the temperature of the battery cell increases, the refrigerant 700 may be further smoothly vaporized in the hollow part C, and the unit battery cell 40 may be further smoothly cooled. When the battery cell is cooled down to a normal temperature, the vaporized refrigerant is returned to the liquid state and remained in the hollow part.

Also, when the empty space S1 in the hollow part C has a pressure greater than the atmospheric pressure, the vaporization temperature of the refrigerant 700 may be greater than that when the empty space S1 has the atmospheric pressure. That is, when the vaporization temperature of the refrigerant 700 is greater than the room temperature and less than the temperature generated by the unit battery cell 40, the vaporization temperature of the refrigerant 700 may be matched around the heat-generation temperature of the unit battery cell 40 by making the pressure of the empty space S1 to be greater than the atmospheric pressure. Thus, the vaporization of the refrigerant 700 may be actively performed around the heat-generation temperature of the unit battery cell 40, and an efficiency of cooling the unit battery cell 40 may increase.

As described above, the vaporization temperature of the refrigerant may be adjusted by adjusting an inner pressure of the hollow part C according to the heat-generation temperature of the battery cell. The vaporization temperature of the refrigerant may be adjusted according to an own property of the refrigerant and a pressure of the hollow part.

Here, the heat-generation temperature of the unit battery cell 40 may be a predetermined temperature selected within a temperature range greater than a temperature range of a normal operation of the unit battery cell 40 and less than a predetermined temperature range in which the unit battery cell 40 is deteriorated by heat.

The refrigerant 700 may be phase-changed from the liquid state to the gas state by receiving heat from the bottom plate of the cylinder body 610 and dissipate heat of the bottom plate of the cylinder body 610 as much as predetermined heat used for the phase change. The refrigerant 700 in the gas state may contact the top plate of the cylinder body 610 and be liquefied while dissipating heat to the top plate of the cylinder body 610. The heat accommodated by the top plate of the cylinder body 610 may be dissipated to the outside of the cylinder body 610. Here, an insulation ring may be disposed between the top plate and the side plate of the cylinder body 610. The refrigerant 700 may include various kinds of refrigerants. The refrigerant 700 may include various volatile materials that are easily phase-changed at the heat-generation temperature of the unit battery cell 40. Alternatively, the refrigerant 700 may include water.

1.6. Operation of Battery Cell Cooling Device

As described above, the battery cell cooling device may be assembled to the unit battery cell 40 in a one-to-one correspondence manner to individually cool the unit battery cell 40. That is, the heat generated from the inside of the unit battery cell 40 may be conducted to the battery can and dissipated from an upper end of the battery can to the body part 600 through the thermal interface material 500.

The heat dissipated to the body part 600 may vaporize the refrigerant 700 from the liquid state to the gas state, and the bottom plate of the body part 600 may be cooled as much as heat used for the vaporization. The vaporized refrigerant 700 in the liquid state may ascend along the empty space S1 to contact the top plate of the body part 600, thereby being liquefied. The heat transferred to the top plate of the body part 600 may be dissipated to the atmosphere at the outside of the body part 600.

In accordance with an exemplary embodiment, the heat transfer from the bottom plate to the top plate of the body part 600 may be achieved by phase-changing the refrigerant 700 isolated in the hollow part C in the body part 600 while the heat of the battery cell is transferred to the body part 600 through the thermal interface material 500. Thus, the battery cell may be smoothly cooled although without using a power unit for refrigerant circulation such as a pump, and the cooling device may have a simplified configuration.

2. Battery Pack in Accordance with an Exemplary Embodiment

Figure 3:
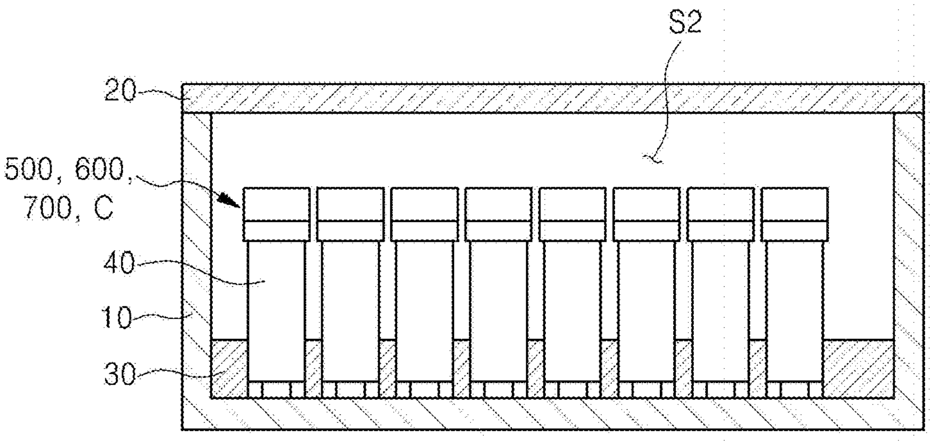
FIG. 3 is a cross-sectional view illustrating the battery pack in accordance with an exemplary embodiment.

FIG. 3 is a cross-sectional view illustrating the battery pack in accordance with an exemplary embodiment.

Hereinafter, the battery pack including the battery cell cooling device in accordance with an exemplary embodiment will be described with reference to FIGS. 1 to 3.

*Here, features overlapped with those described in the battery cell cooling device in accordance with an exemplary embodiment will be omitted or simply described.

The battery pack in accordance with an exemplary embodiment includes a plurality of battery cells 40, a housing 10 in which the plurality of battery cells 40 are accommodated, and a plurality of battery cell cooling devices 500, 600, 700, and C assembled with the plurality of battery cells 40 in an one-to-one correspondence manner to individually cool the battery cells.

Also, the battery pack may further include a cover 20 coupled to the housing 10 and a tray 30 disposed in the housing 10 to fix the battery cell 40.

2.1. A Plurality of Battery Cells 40

Each of the plurality of battery cells 40 may be a cylindrical can-type secondary battery. Alternatively, each of the plurality of battery cells 40 may be a rectangular can-type secondary battery. The plurality of battery cells 40 may be arranged in a horizontal direction crossing the vertical direction. The electrode terminal of each of the plurality of battery cells 40 may face downward. The plurality of battery cells 40 may be electrically connected to each other by a bus bar (not shown).

2.2. Housing 10

The housing 10 may include a bottom part having a predetermined area and a sidewall part extending a predetermined height upward from an edge of the bottom part. The housing 10 may have a rectangular cylinder shape having an opened upper portion. Alternatively, the housing 10 may have various shapes.

2.3. Cover 20

The cover 20 may extend to have a predetermined area so that the cover 20 is mounted to an upper end of the sidewall part of the housing 10. As the cover 20 is coupled to the housing 10, an inner space for accommodating the plurality of battery cells 40 may be defined between the cover 20 and the housing 10. Here, the inner space is not limited to a sealed space. That is, a portion of the inner space may be opened to the atmosphere as necessary. The plurality of battery cells 40 may be accommodated in the inner space.

The cover 20 may have a rectangular plate shape. Alternatively, the cover 20 may have a shape changed in accordance with the shape of the housing 10. For example, the cover 20 may have a circular plate shape when the housing 10 has a cylindrical shape.

2.4. Tray 30

The tray 30 may be seated on the bottom part of the housing 10. The tray 30 may support an outer circumferential surface of a lower end of each of the plurality of battery cells 40. That is, a plurality of holes may be defined in the tray 30 in the vertical direction, and the plurality of battery cells 40 may be inserted to and supported by the plurality of holes, respectively. Here, each of the plurality of battery cells 40 may be referred to as a unit battery cell 40. A bus bar having a predetermined pattern may be provided to a top surface or a bottom surface of the tray 30, and the bus bar may connect the plurality of battery cells 40 to each other. The bus bar may be connected with a predetermined input and output terminal (not shown) provided in the housing 10.

2.5. Battery Cell Cooling Device 500, 600, 700, and C

The battery cell cooling device may be disposed in the housing 10 and spaced apart from an inner surface of the housing 10, so that the battery cell cooling device is cooled by an air-cooling manner.

The battery cell cooling device may include a body part 600 having one surface contacting the battery cell 40 and the other surface that is opposite to the one surface and exposed to an inner space S2 of the housing 10, a hollow part C isolated from the inner space S2 of the housing 10, and a refrigerant 700 isolated and accommodated in the hollow part C.

The body part 600 may have one side protruding to be detachably coupled to the battery cell 40 while surrounding an upper end of the battery cell 40. The refrigerant 700 may be accommodated in the hollow part C defined in the body part 600. Here, the refrigerant 700 may be charged to fill a portion of the hollow part C, and the rest portion of the hollow part C may exist as an empty space S1. Here, the empty space S1, as a space in which the refrigerant 700 in the liquid state does not exist, may be filled with a predetermined gas. Alternatively, the empty space S1 may be formed in a vacuum state as necessary.

The battery cell cooling device may further include a thermal interface material 500 disposed between the body part 600 and the battery cell 40. The thermal interface material 500 may be attached to a bottom surface of the body part 600 to contact a top surface of the battery cell 40. Also, the battery cell cooling device may further include a heat dissipation pin (not shown) protruding from a surface of the body part 600 to increase a surface area of the body part 600. The surface area of the body part 600 may be increased by various methods in addition to the above-described method. For example, the surface area of the body part 600 may be increased by forming a wrinkle structure on the surface of the body part 600.

Since the detailed configuration of the battery cell cooling device is previously described in detail, hereinafter, a redundant description will be omitted.

The plurality of battery cell cooling devices may have different cooling capacities according to positions thereof. Particularly, the battery cell cooling device assembled to the outer battery cell may have at least one of a surface area and a stored refrigerant amount less than those of the battery cell cooling device assembled to the inner battery cell.

For example, since the plurality of battery cells 40 are concentrated in the housing 10 of the battery pack, the battery cells 40 may serve as obstacles to each other to easily accumulate heat. Particularly, when the plurality of battery cells 40 are arranged in a predetermined row and a predetermined column, since the inner battery cell is disadvantageous relatively to the outer battery cell, a temperature of the inner battery cell may be more increased.

Thus, for example, as the body part 600 of the battery cell cooling device assembled to the outer battery cell has a relatively short vertical length, and the body part 600 of the battery cell cooling device assembled to the inner battery cell has a relatively long vertical length, a difference between the surface areas thereof may be reduced, and the inner battery cell may be further quickly cooled to achieve an effect of evenly cooling the entire battery cells in the horizontal direction.

Likewise, as a relatively small amount of refrigerant 700 is stored in the body part 600 of the battery cell cooling device assembled to the outer battery cell, and a relatively large amount of refrigerant 700 is stored in the body part 600 of the battery cell cooling device assembled to the inner battery cell, a difference between the amount of refrigerant may be reduced, and the inner battery cell may be further quickly cooled the outer battery cell to evenly cool the plurality of battery cells in the horizontal direction.

That is, a heat distribution of the battery cells in the housing may be easily adjusted by using a simple method of differentiating sizes or the amount of the refrigerant.

3. Method for Cooling Battery Cell in Accordance with an Exemplary Embodiment

Figure 4:
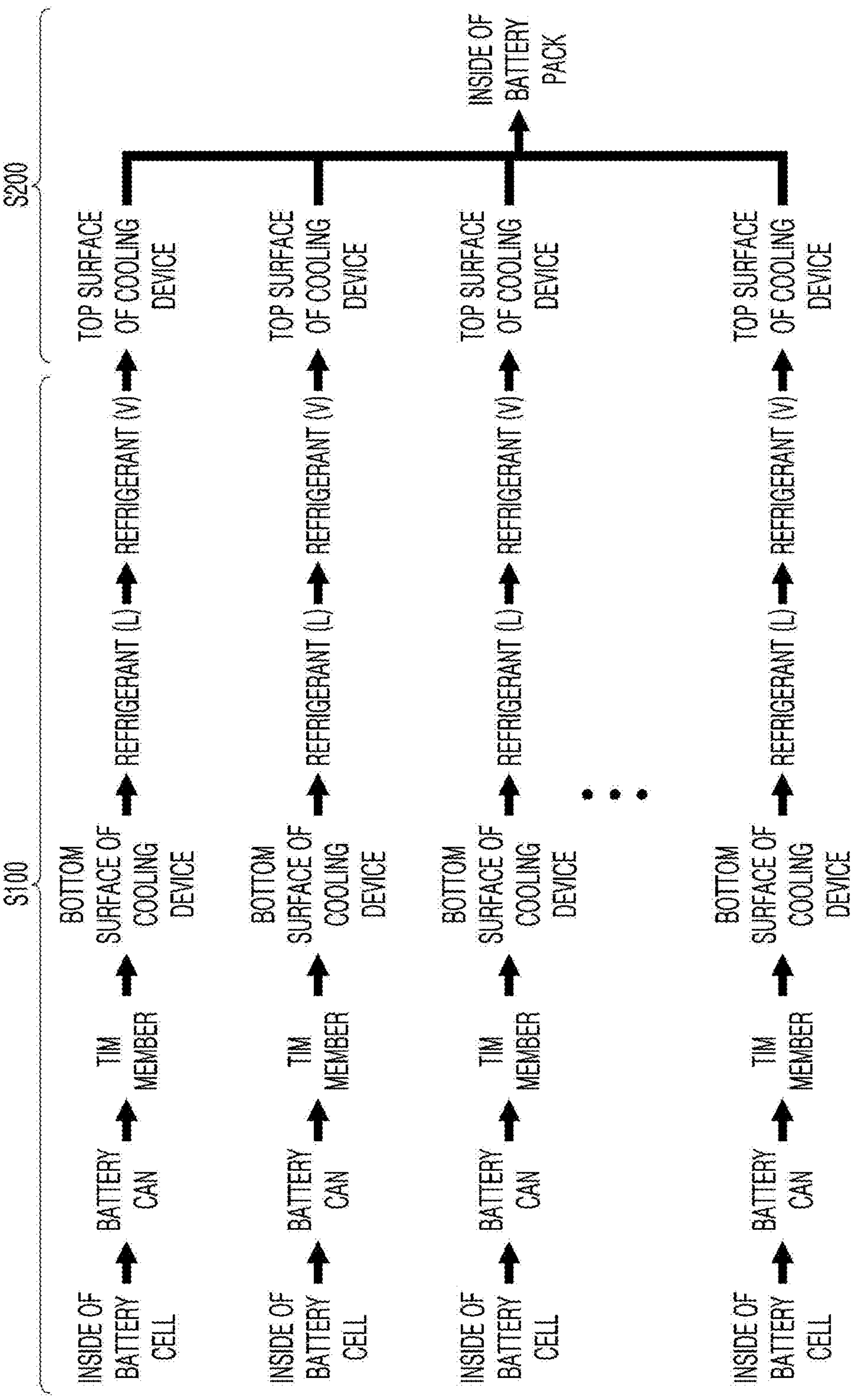
FIG. 4 is a conceptual view showing a heat dissipation flow in a method for cooling a battery cell in accordance with an exemplary embodiment.

FIG. 4 is a conceptual view showing a heat dissipation flow in a method for cooling a battery cell in accordance with an exemplary embodiment.

The method for cooling the battery cell in accordance with an exemplary embodiment will be described with reference to FIGS. 1 and 4. Here, a redundant description will be omitted.

The method for cooling the battery cell in accordance with an exemplary embodiment includes a process S100 of individually cooling battery cells and a process S200 of cooling entire battery cells.

3.1. Process S100 of Individually Cooling Battery Cells

The process S100 of individually cooling the battery cells absorbs heat from each of a plurality of battery cells 40 and dissipate heat to the refrigerant 700 accommodated in each of the plurality of battery cell cooling device by using the plurality of battery cell cooling device connected to the plurality of battery cells 40 in an one-to-one correspondence manner.

Here, the heat generated from the inside of the battery cell is transferred to the thermal interface material 500 and transferred to the refrigerant L in the liquid state through a bottom surface of the cooling device, e.g., a bottom surface of the body part 600. Thus, the refrigerant L in the liquid state is phase-changed to the refrigerant V in the gas state and discharged to a top surface of the cooling device, e.g., a top surface of the body part 600.

As described above, the process of individually cooling the battery cells may allow the refrigerant to absorb the heat by using a vaporization method in a state in which the refrigerant accommodated in each of the plurality of battery cell cooling device is isolated in each of the plurality of battery cell cooling device.

3.2. Process S200 of Cooling Entire Battery Cells

The process S200 of cooling entire battery cells dissipate all heat absorbed by the plurality of battery cell cooling devices in the housing 10 in which the plurality of battery cells 40 are accommodated.

That is, the refrigerant V may be phase-changed into the gas state, and the heat discharged to the top surface of the cooling device, e.g., the top surface of the body part 600 may be discharged to the inner space S2 of the housing 10.

Furthermore, the heat dissipated into the housing 10 may be discharged to the outside of the housing 10. Here, the dissipation may be performed by various methods.

For example, the heat may be dissipated from the inside of the housing 10 to the outside through the cover 20. Alternatively, the heat may be dissipated to the outside through a ventilation hole (not shown) defined in at least one of the housing 10 and the cover 20. Although the heat in the housing 10 is not dissipated to the outside, the inner space S2 of the housing 10 may accommodate the heat dissipated to the top surface of the body part 600 as much as a predetermined temperature that is able to be accommodated in the gas existing in the inner space S2 of the housing 10. Here, the heat accommodation degree may be determined according to a temperature difference between the inner space S2 of the housing 10 and the battery cell and the kind of the gas accommodated in the inner space S2 of the housing 10.

4. Method for Cooling Battery Cell in Accordance with Another Exemplary Embodiment A method for cooling the battery cell in accordance with another exemplary embodiment includes a cooling device configuration process and a battery cell cooling process.

4.1. Cooling Device Configuration Process

The cooling device configuration process allows the battery cell cooling device to contact the battery cell 40 by arranging the thermal interface material 500 between one end of the battery cell 40 and the battery cell cooling device having the hollow part C. That is, the battery cell cooling device with the thermal interface material 500 attached may contact the upper end of the battery cell 40, and the body part 600 of the battery cell cooling device and the refrigerant disposed therein may contact the battery cell 40 through the thermal interface material 500.

4.2. Battery Cell Cooling Process

The battery cell cooling process cools the heat generation of the battery cell 40 by using the temperature or vaporization heat of the refrigerant 700.

4.2.1. Battery Cell Cooling Process Using Temperature of Refrigerant 700

The battery cell cooling process using the temperature of the refrigerant 700 uses an air-cooling type cylinder body. The temperature of the cylinder body 610 and the refrigerant 700 disposed therein may be maintained by air-cooling the cylinder body 610 of the body part 600 in the housing 10 of the battery pack, and as the heat-generating unit battery cell 40 thermally contacts the refrigerant 700 maintaining the temperature, the heat may move from the unit battery cell to the refrigerant 700, and the heat generation temperature of the unit battery cell 40 may be reduced to the maintained temperature of the refrigerant 700.

4.2.2. Battery Cell Cooling Process Using Vaporization Heat of Refrigerant 700

The battery cell cooling process using the vaporization heat of the refrigerant 700 may vaporize the refrigerant 700 in the liquid state when the heat-generating unit battery cell 40 thermally contacts the refrigerant 700 maintaining the temperature and cool the unit battery cell 40 by using the vaporization heat absorbed by the refrigerant 700 in the gas state. Here, the vaporized refrigerant 700 may thermally contact the top plate of the cylinder body 610 to dissipate predetermined heat into the battery pack through the top plate of the cylinder body 610, and then returned into the liquid state and accommodated again in the lower portion of the hollow part C.

Although the embodiments of the present disclosure is set forth for the explanation of the present disclosure and is not set forth for the limitation of the present disclosure. Further, the configurations and modes presented in the above embodiments of the present disclosure will be combined and modified in various ways. It should be noted that these combinations and variations may be seen in the category of the present disclosure. In other words, the present disclosure will be implemented in a variety of different forms within the scope of claims and equivalents. It will be understood by those skilled in the art that the present disclosure is susceptible to various modifications within the scope and spirit of the present disclosure.

DESCRIPTION OF THE REFERENCE SIGNS

10: housing
20: cover
30: tray
40: battery cells
500: thermal interface material
600: body part
610: cylinder body
620: holder
700: refrigerant
C: hollow part
S1: empty space
S2: inner space

The invention claimed is:

1. A battery cell cooling device, comprising:
a body part having one side protruding to be assembled with a unit battery cell in a one-to-one correspondence manner;
a hollow part defined in the body part and isolated from an outside, the hollow part configured to accommodate and isolate a refrigerant;
a thermal interface material disposed at a lower end of the body part to contact an upper end of the unit battery cell; and
a holder extending downward from a lower edge of the body part to be coupled with an outer circumferential surface of the unit battery cell,
wherein the thermal interface material and the holder are configured to not extend to a lower end of the unit battery cell.

2. The battery cell cooling device of claim 1, wherein the body part comprises a cylinder body having the hollow part, and
wherein the holder protrudes from a lower surface of the cylinder body so as to be coupled with the outer circumferential surface of the unit battery cell.

3. The battery cell cooling device of claim 2, wherein the holder protrudes from an edge of a bottom plate of the cylinder body, and
the thermal interface material is attached to the bottom plate at an inside of the holder to contact the bottom plate of the cylinder body and the unit battery cell therebetween.

4. The battery cell cooling device of claim 1, wherein the refrigerant has a volume less than a capacity of the hollow part.

5. The battery cell cooling device of claim 4, wherein an empty space in the hollow part has a pressure lower than an atmospheric pressure.

6. The battery cell cooling device of claim 1, wherein the battery cell cooling device, including the body part, the hollow part, the thermal interface material, and the holder, is configured to not extend to the lower end of the unit battery cell.

7. The battery cell cooling device of claim 1, wherein the thermal interface material is configured to be disposed between the body part and the unit battery cell without being disposed between the unit battery cell and a second unit battery cell adjacent to the unit battery cell, and
wherein the thermal interface material is configured to be attached to the unit battery cell without being attached to the second unit battery cell adjacent to the unit battery cell.

8. The battery cell cooling device of claim 1, wherein the body part is configured not to be shared between adjacent unit battery cells.

9. The battery cell cooling device of claim 1, wherein:
an upper surface of the thermal interface material is connected to the lower end of the body part, and an entire lower surface of the thermal interface material is configured to contact the upper end of the unit battery cell;
the thermal interface material is configured to be positioned between the lower end of the body part and the upper end of the unit battery cell;
the entire lower surface of the thermal interface material has a plate shape; and
the plate shape of the entire lower surface of the thermal interface material matches a shape of the upper end of the unit battery cell.

* * * * *